Dec. 4, 1928.

G. H. FRASER

DRIVE AND DRIVEN DEVICE

Filed Sept. 12, 1924   3 Sheets-Sheet 1

1,694,008

INVENTOR:
George Holt Fraser

Dec. 4, 1928.

G. H. FRASER 1,694,008

DRIVE AND DRIVEN DEVICE

Filed Sept. 12, 1924   3 Sheets-Sheet 3

INVENTOR:
George Holt Fraser

Patented Dec. 4, 1928.

1,694,008

UNITED STATES PATENT OFFICE.

GEORGE HOLT FRASER, OF BROOKLYN, NEW YORK.

DRIVE AND DRIVEN DEVICE.

Application filed September 12, 1924. Serial No. 737,412.

This invention relates to driving mechanism and to driven devices, and aims to provide certain improvements therein.

It relates especially to drives for unbalanced or variable load devices, to frictional transmission, to variable speed mechanism, and to apparatus in which any of these are applicable, and in its preferred form provides an improved frictional, variable, automatic driving means, and improved apparatus in which such means are utilized.

The invention aims to increase efficiency, and availability of said means and devices, to save power consumption in operating them, and to improve their constructions and operation.

To this end in carrying out the preferred adaptation of my present improvements I provide reciprocal reversely revolving parts co-acting with an intermediate revolving part to mutually resist and balance the axial stress of the reversely revolving parts by transmitting this to the intermediate part at its diametrically opposite sides;

And I preferably provide traction or friction for driving engagements between these parts, and make an intermediate part the driving part and adjustable radially to the other parts to vary their speed;

And I preferably provide for automatically adjusting the intermediate part to vary the speed of the other parts with variations in the load on them;

And I provide various other features of improvement in construction, arrangement and use of said improvements which will hereinafter be more fully set forth.

My present improvements are applicable to a wide range of mechanical and other devices, and can be applied to many transmission uses, but for purposes of illustration I will describe them in their preferred form as applied to the preferred form of my improved ball or tube mills, with reference to the accompanying drawings in which—

Fig. 6 is an enlarged fragmentary plan view partly in horizontal axial section of part of the driving mechanism shown in Fig. 1, and Fig. 7 is a diagram showing the ball mills revolved faster than and feeding the pebble mills at a measured rate to preserve their balance.

Figure 1:
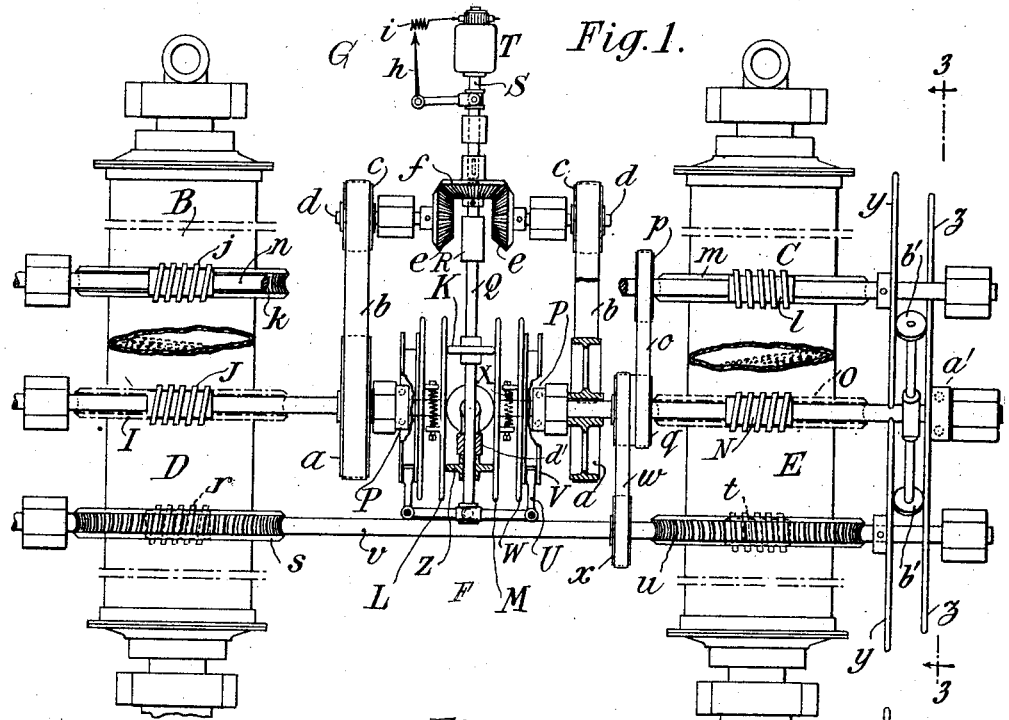
Fig. 1 is a fragmentary and diagrammatic plan view of a four cylinder ball and tube mill unit embodying the preferred form of my improvements and operating according to my improved method, the upper cylinders being broken out to show the lower cylinders, and some of the parts being in section for clearness.
Figure 2:
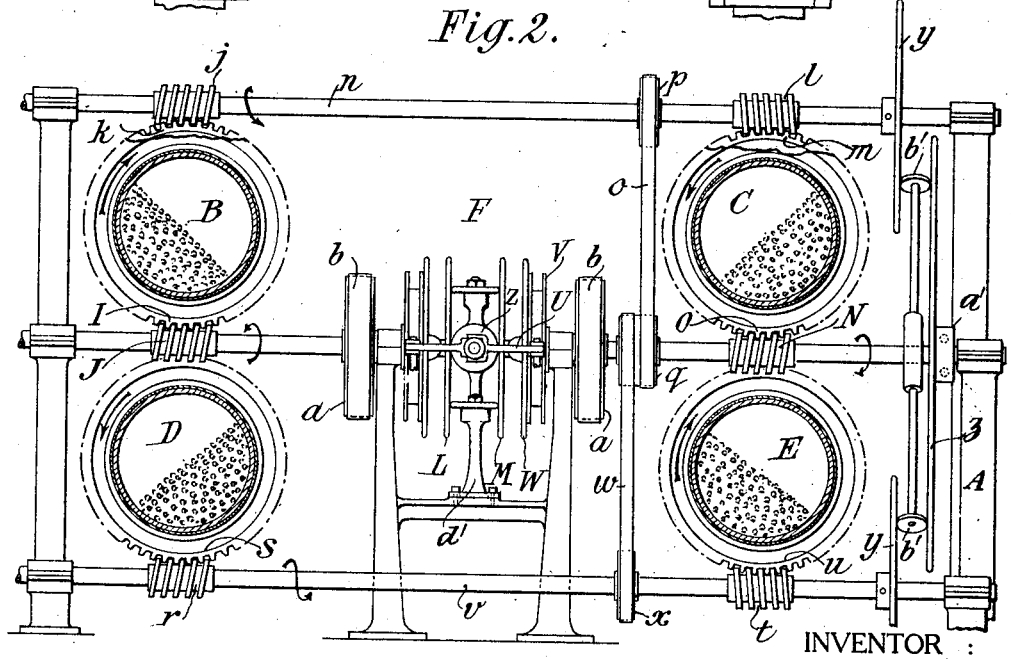
Fig. 2 is a fragmentary vertical transverse section thereof cut approximately on the line 2—2 in Fig. 3 and looking in the direction of the arrow, some of the parts being broken out for clearness.
Figure 3:
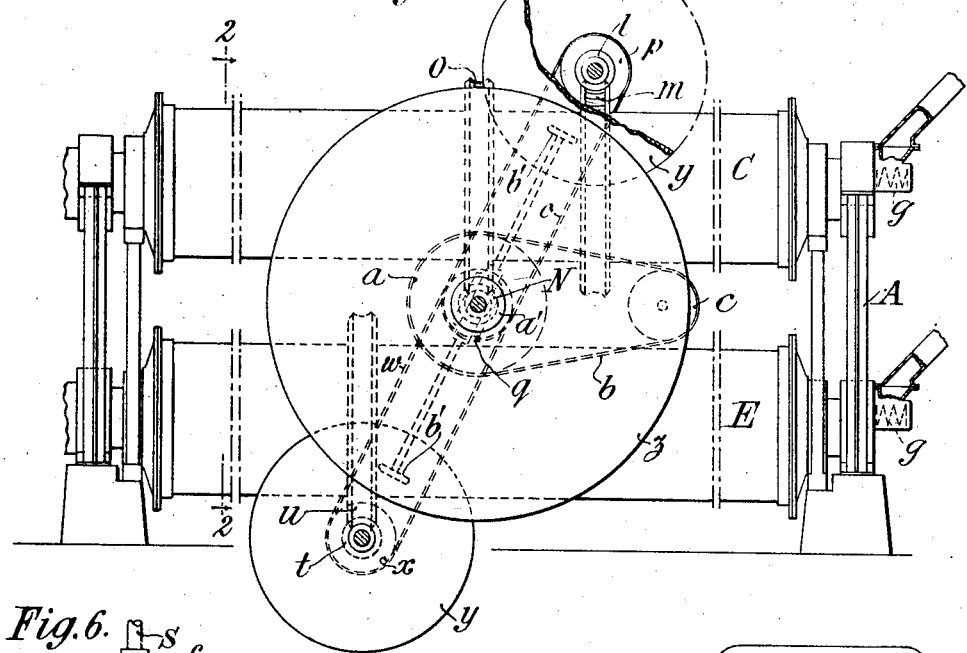
Fig. 3 is a fragmentary side elevation thereof, partly in section on the line 3—3 of Fig. 1 and looking in the direction of the arrow, some of the parts being broken out for clearness.

Referring especially to Figs. 1 and 2 I will now describe the preferred form of my invention as applied to ball and tube mills.

Referring to the drawings, let A represent the frame or support of a four cylinder pulverizing installation, B, C, D and E the cylinders or drums thereof, F the driving mechanism for revolving the cylinders, and G the source of power for operating their driving mechanism.

These parts may be of any usual or suitable construction or arrangement for utilizing the tumbling of their contents during their revolution for pulverizing material according to the usual ball or tube mill method.

Such drums are usually charged with balls, slugs or pebbles and continuously fed with material to be pulverized so as to make the charge in each of them about half fill their internal chamber. When idle this charge settles and substantially balances itself at the bottom of the chamber, but as the cylinder is revolved it rises with the ascending side until the upper part cascades across the chamber to the lower side, speed being adjusted to maintain the unbalanced condition which will give the most effective cascading of the contents.

The foot pound loss incident to the tumbling of the contents from the top to the bottom of the chamber is unavoidable, and power consumption for this as well as for revolving the drum and its charge are essential to doing the work in this manner, but in addition to this essential consumption of power there is a considerable expenditure of power to maintain the unbalanced load of the charge during operation, the major portion of which has to be sustained on the rising side of the drum.

One feature of my present improvements aims to relieve the primary source of power from sustaining this unbalanced load while permitting it to apply the necessary power to revolve the drum and its charge and compensate for the foot pounds loss incident to tumbling, and to this end I provide for separating the stress of the unbalanced load from that to the effective load, and means for sustaining this unbalanced stress additionally to or independent of the source of power for revolving the drum.

This may be accomplished in many ways, but I prefer to use a worm gear for the drum, a worm meshing with this gear for revolving the drum, antifrictional means axially sustaining the worm to resist the driving and unbalanced stress of the drum, and means for revolving the worm from a source of power independent of its axial stress.

As shown in Fig. 1 the drum B is provided with a left hand worm gear I meshing with the left hand worm J, which revolves in the direction of the arrow to cause the drum to revolve so that its charge rises on its left hand side making an unbalanced load tending to force the worm J toward the right, and movement of the worm in this direction is resisted by a roller K co-acting with a wheel L on the worm shaft, which roller K is sustained by a wheel M on the worm shaft of a left hand worm N meshing with a left hand worm gear O on the drum C to revolve this drum reversely to the drum B so that its charge will rise on its right hand side and its unbalanced load will tend to force the worm N toward the left, so that this stress will be transmitted through its wheel M against the roller K at diametrically opposite the wheel L, so that the axial stress on each worm will be balanced by that of the other through the medium of the roller K which revolves between their wheels and sustains their driving and dead loads, which should best be approximately equalized by properly charging the respective drums to this end.

The roller K may be a mere anti-friction roller and the worms may be suitably reversely driven, but I prefer to utilize the roll K as a driving roller and to apply the source of power to it, and to have it tractionally drive both worms, so that it sustains their axial stress and utilizes this for frictional or tractional engagement between its edge driving face and the side driving faces of the wheels L and M.

Preferably the drums B and D are ball mills revolving at different speed than and feeding the drums C and E which are pebble mills, and their worms and gears are differentiated to suit their relative speeds. A conveyor or gravity connects the ball mill discharge with the pebble mill intake, and any usual measured feed and discharge preserves their relative charges to maintain desired unbalanced conditions as shown in Fig. 7.

The roller K is sustained by a movable or sliding bearing $d'$ so it can move axially of the worm shafts to compensate for any axial movement thereof due to slight variations in the charges of the respective drums, such movement being limited by the thrust roller bearings P for each worm shaft. The shaft Q of the roller K is connected by a compensating or other movable joint R with the shaft S of a motor or other primary source of power T.

In starting a tumbler mill more power is required to lift the charge and overcome its inertia than is required to maintain revolution after the charge has assumed its running position, and my invention preferably provides for automatically varying the drive to suit variations in load, which I preferably do by moving the roller K radially of the wheels. The roller is adjusted axially to give the desired speed of normal operation, varied from its normal position to vary speed of the drums, and automatically moved from and toward this position according to load.

Any suitable means for automatically operating the roller may be used but I prefer my improved device comprising a forked lever U operated by a movable ring or cam V which revolves with and is carried by a hub W fixed to the worm shaft outside of the traction wheel and driven from the latter by a spring X so that when the stress transmitted from the traction wheel through the hub W to the worm shaft exceeds the resistance of the spring the traction wheel can rotate relatively to the hub on the worm shaft to the extent that the spring yields, and this relative rotation will tilt a lever Y fulcrumed to the wheel and having one end in engagement with the hub and its other end connected to the ring V in such manner that when the wheel and hub are in normal working position the ring will be in normal position on the hub, but should the stress cause the spring X to yield the ring will be moved axially and tilt the lever U to move the roller K outwardly and lower the speed of the worm shaft and correspondingly increase the leverage of the roller by moving it into engagement with a portion of the wheel of larger diameter. As load diminishes the spring X will restore the wheel and hub to their normal relative position, the ring will be returned to its position, and the lever U will be shifted to restore the roller K to its normal position.

An idler roller Z slidingly mounted on the shaft Q balances the stress between the wheels and tractionally transmits motion from one to another.

My invention preferably supplements the tractional drive of the roller K by individual belt drives while speed is normal, and preferably disconnects these during variations of speed.

This is preferably accomplished by mounting a pulley $a$ on each worm shaft so that it revolves therewith but is slidable axially thereof so that the axial stress of the worm shaft is independent of the pulley and is sustained by its thrust bearing or thrust rollers while its rotating stress only is carried by the pulley. As shown a pulley $a$ is provided for each worm shaft and driven by a belt $b$ from a pulley $c$, each of which is mounted on a countershaft $d$ and driven by a bevel gear $e$ from a bevel gear $f$ which is feathered to the shaft S so that it can slide axially thereof and is connected to the shaft Q to be moved therewith in such manner that when the roller K is in its outward position the gear $f$ will be moved out of mesh with the gears $e$.

These gears and pulley should be proportioned to correspond in speed of drive with the speed at which the roller K operates the worm shafts in its mean position, so that then they will supplement it, but when speed is reduced by moving this roller outward they will be disconnected and the roller alone will be relied on for starting and stopping.

To vary the supply of power to the primary driver I preferably provide a lever $h$ operated by the movement of the automatic load varying device to regulate the motor according to the load on it in any suitable manner, as by operating a resistance $i$ controlling its current or speed.

To insure uniform charging of the multiple drum installation after equal charging has been effected each is provided with regulating tending means as for example the spiral feeders $g$ which are adjusted to equal feeding each half of the unit.

Preferably I supplement the worms J and N by a left hand worm $j$ engaging a supplementary left hand worm gear $k$ on the drum B and a right hand worm $l$ engaging a supplementary right hand worm gear $m$ on the drum C, which worms are adjustably connected together by a tension shaft $n$ so that they revolve together at the proper speed to coincide with the speed of the drums and are adjusted to transmit from one to the other a portion of the unbalanced stress or load to resist this. The shaft $n$ is revolved at suitable speed in any suitable manner, but preferably from the shaft to the worm N, as by a belt $o$ and pulleys $p$ and $q$ suitably proportioned to give the desired speeds requisite to the revolution of the drums and arranged so that part of their unbalanced loads shall be carried by the tension shaft $n$ and transmitted by it from one to the other drum.

Preferably I supplement the worms J and N by a left hand worm $r$ below and engaging a supplementary left hand worm gear $s$ on the drum D, and by a right hand worm $t$ below and engaging a supplementary right hand worm gear $u$ on the lower drum E, which worms are adjustably mounted on a compression shaft $v$ so that they revolve together at the proper speed to coincide with the speed of these drums and are adjusted to transmit from one to the other a portion of the unbalanced stress or load to resist this. The shaft $v$ is preferably driven from the shaft of the worm N by the pulley $q$, belt $w$ and pulley $x$.

The shafts $n$ and $v$ preferably float axially so that they can adapt themselves to equalize between them the varying stress resisted by their respective worms and to transmit these from one to another drum, and I prefer to position them axially by fixing a thrust disc $y$ on each end of each, and providing a reciprocal disc $z$ opposite these discs and sustained by an anti-friction bearing $a'$ preferably carried on the end of the shafts of the worms J and N, and by providing anti-friction rollers $b'$ between the discs $y$ and $z$ to transmit the axial stress of the shafts $n$ and $v$ to the disc $z$ and through it to the shafts of the worms J and N. The discs $y$ and $z$ have side friction faces and the rollers $b'$ have edge traction faces in the construction shown, so as to insure equal tractional drive and speed for the supplementary worms, and are preferably supplied at each end of their shafts.

In operation with the construction shown the roller K will revolve the wheels L and M in opposite directions, and their left hand worms J and N will revolve the drum in opposite directions as indicated by the arrows in each. This will throw the charge in each drum in position opposite to that of the other drum so that its unbalanced load will act in the direction indicated by the arrow without the drum. This will tend to move the worm J toward the roller K from the left and the worm N toward the roller K from the right, and will be resisted by this roller and transmitted from one to the other of the wheels L and M and serve to increase the traction between the edge of the roller and the side faces of the wheels to insure a suitable tractional driving engagement between these. The roller K will oscillate under variations in this end stress of these worms within the limits permitted by the ball thrust bearings P which will be adjusted to suit the variation desired.

The excessive starting load will compress the springs X, permitting the wheels L and M to move relatively to their hubs W, which will cause the regulator U to move the roller K outwardly and thus increase its leverage by moving it to the larger outer diameter of the wheels so as to lower their speed until the excessive load is overcome. In the construction shown this outward movement of the roller will also disengage the bevel gear $f$ and permit the pulleys $c$ to run freely while the speed of the wheels is below normal, and it will also vary the primary mover to increase its power or diminish its speed during this overload. As the overload diminishes the springs X will restore the wheels relatively to their hubs, causing the regulator to restore the roller to its normal position, which will engage the bevel gear $f$ with its pinions $e$ and restore the primary mover to normal position which will be maintained during normal operation.

It will be seen that my invention provides improvements which can be variously and advantageously availed of, and it will be understood that it is not limited to the particular arrangement, combination, or details, set forth as constituting the preferred embodiment thereof, as it may be availed of in whole or in part according to such modifications as circumstances or the judgment of those skilled in the art may dictate without departing from the sprit of the invention.

When used with two drums and a single shaft the worm should be right and left and the shaft should be a tangential compression member suitably positioned axially and driven rotatively by means independent of its axial stress.

Figure 4:
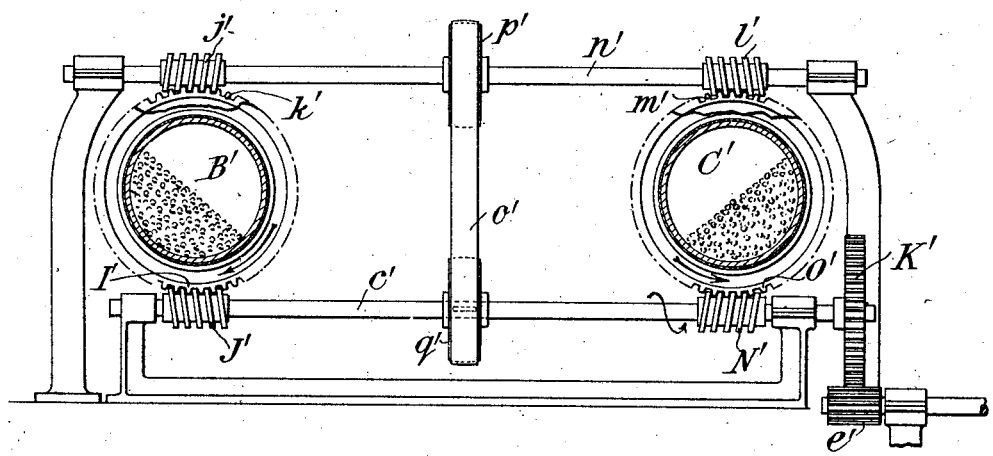
Fig. 4 is a fragmentary vertical cross section of a two cylinder tube mill showing a modified utilization of my improvements.

One such modification is shown in Fig. 4 in which the opposite drums B' and C' are driven by a compression shaft $c'$ on which is fixed a right hand worm J' meshing with a right hand worm gear I' on the drum B' to revolve it in the direction of the arrow, and a left hand worm N' meshing with a left hand gear O' on the drum C' to drive it in the reverse direction, the unbalanced load of each drum being transmitted to the other through the shaft $c'$, which is axially movable under this stress and has fixed to it a driving gear K' which participates in its limited axial movement and meshes with a wide faced pinion $e'$ along which it can float axially but by which it is revolved to drive the worms.

Feathered on the shaft $c'$ is a pulley $q'$ which is revolved by it but independent of its axial movement and which through a belt $o'$ and pulley $p'$ on a tension shaft $n'$ revolves the latter, which carries a left hand worm $j'$ meshing with a left hand worm gear $k'$ on the drum B', and also a right hand worm $l'$ meshing with a right hand gear $m'$ on the drum C', these worms and this shaft serving as supplementary means for resisting and transmitting unbalanced overload stress from one to the other drum, and being proportioned, adjusted and revolved suitably for such purpose.

Figure 5:
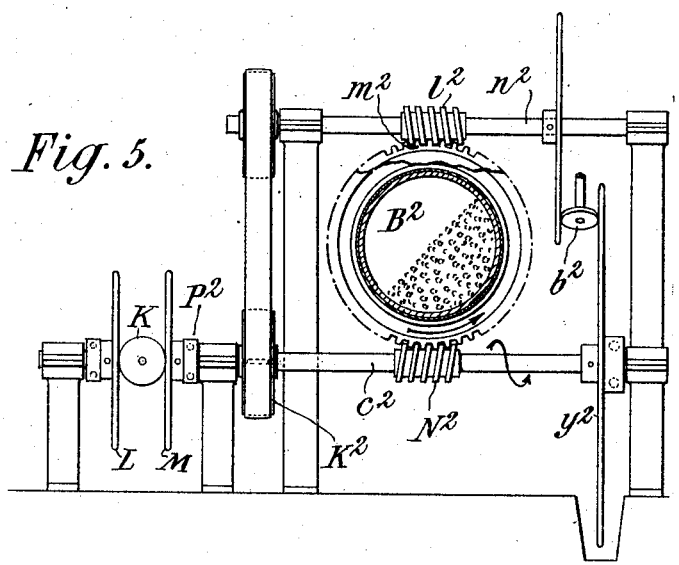
Fig. 5 is a fragmentary vertical cross section of a one cylinder tube mill showing another modified utilization of my improvements.

A single drum utilization is shown in Fig. 5, in which the drum $B^2$ is revolved by a left hand worm $N^2$ carried by a compression shaft $c^2$ sustained by an anti-friction thrust bearing $P^2$, which shaft is revolved independently of its stress by drive pulley $K^2$ splined on it.

With this construction the unbalanced stress may be apportioned between multiple worms by using a right hand worm $l^2$ and a supplementary right hand worm gear $m^2$ above the drum $B^2$, in which case I prefer to fix on the shaft $c^2$ a thrust disc $y^2$ and on the shaft $n^2$ a similar disc, and to mount between their opposed side traction faces an edge traction roller $b^2$ which receives and resists the opposed axial stress of the worms and tractionally drives one from the other in reverse direction and at proper relative speed to correspond with the speed of rotation of the drum and to apportion its unbalanced load between them.

My invention includes using two drums successively, the first as a ball mill for preliminary grinding and the second as a tube mill for receiving and finishing the discharge from the first, in which case I differentiate the speed of each drum to suit it to that best adapted to its charge or function, preferably by varying the pitch or diameter of its worm and worm gear relatively to those of the other drum so that the intermediate driving gear may sustain the unbalanced load of each against the other while driving them at different speeds.

What I claim is:

1. In combination, a driven part revolving about an axis and having a side traction face, a shaft sustaining an axial stress and axially sustained by and revolved by said part, a driving part revolving about an axis angular to said axis and having an edge traction face in tractional engagement with said side face for driving it, and means controlled by said first member for varying the position of said second member radially of said first member.

2. In combination, driven parts oppositely revolving about the same axis and each having a side traction face opposite and spaced from that to the other, an axially slidable driving part movable radially of said first parts and revolving about an axis angular to said axis and having an edge traction face tractionally engaging said side faces to reversely revolve said first parts, and means controlled by one of said side face parts and operated by the driving stress transmitted by one of said side face driven parts for varying the position of said second part radially of said first parts.

3. In combination, oppositely revolving similar worms, oppositely revolving worm gears driven by said worms respectively, compression means transmitting the axial stress of said worms from each toward and to the other, and means for revolving said worms.

4. In combination, two worms, worm gears independent of each other and respectively revolved in opposite directions by said worms, means connecting said worms to transmit the axial stress of one to the other, and means for revolving said worms as to which they are axially movable.

5. In combination, two worms, oppositely revolving worm gears independent of each other and respectively revolved by said worms, compression means between said worms for resisting their axial stress, and means for revolving said worms as to which they are axially movable.

6. In combination, two worms, oppositely revolving worm gears independent of each other and respectively revolved by said worms, revolving stress transferring means connecting said worms for resisting their axial stress, and means for revolving said worms as to which they are axially movable.

7. In combination, right hand and left hand worms, right hand and left hand worm gears independent of each other and respectively oppositely revolved by said worms respectively, means sustaining the axial stress of said worms, and means as to which said worms are axially movable for revolving said worms.

8. In combination, oppositely revolving worms, oppositely revolving worm gears, independent of each other and respectively revolved by said worms, means sustaining the axial stress of said worms, and means for simultaneously revolving said worms.

9. In combination, oppositely revolving worms, worm gears independent of each other and respectively oppositely revolved by said worms respectively, means between said worms sustaining their axial stress, and means for revolving said worms.

10. In combination, oppositely revolving worms, gears independent of each other and respectively revolved by said worms, revolving means between said worms for transmitting axial stress from one to another thereof, and means for revolving said worms.

11. In combination, oppositely revolving worms, oppositely revolving worm gears revolved by said worms respectively compression means transmitting the axial stress of said worms from each toward the other, and revolving means for driving said worms between them and sustaining their axial stress.

12. In combination, oppositely revolving worms, oppositely revolving worm gears revolved by said worms respectively, wheels sustaining the axial stress of said worms and each having a side traction face opposite and spaced from that to the other, a roller having an edge traction face between and engaging said side faces for sustaining the axial stress of said wheels, and means for driving said parts.

13. In combination, a revolving drum adapted to revolve with an unbalanced load, a worm gear for revolving said drum, a worm for revolving said gear, a wheel for sustaining the axial stress of said worm and having a side traction face, an oppositely revolving wheel for sustaining the axial stress of said worm and having a side traction face opposite and spaced from said first face, a roller having an edge traction face between and tractionally engaging said side faces and transmitting the axial stress of said worms between them, and means for revolving said parts.

14. In combination, a drum adapted to revolve with an unbalanced load, worm gears for revolving said drum, separate revolving and relatively movable worms meshing with said gears respectively, means for revolving said worms, revolving means connected to said worms respectively for sustaining the axial stress of each, and revolving means intermediate of said sustaining means for transmitting the stress of one thereof to the other thereof.

15. In combination, oppositely revolving members each adapted to revolve with an unbalanced load reverse to that of the other, worm gears for revolving said members respectively, worms for revolving said gears respectively, means sustaining the axial stress of said worms from each other, revolving means between said sustaining means for transmitting such stress from one to the other thereof, and means for revolving said parts.

16. In combination, oppositely revolving drums each adapted to revolve a cascading load reversely to the other, worm gears for revolving said drums respectively, worms for revolving said gears respectively, compression means between said worms for resisting their axial stress, revolving means between said resisting means sustaining each thereof from the other thereof, and means for revolving said worms.

17. In combination, a revolving driven member having a side traction face, an axially movable revolving driving member having an edge traction face coacting with said side face to tractionally drive the latter, yielding means carried by one of said parts for drivingly connecting it to its said face, and shifting means operated by said yielding means to vary the axial position of said edge driving face to vary the speed of said driven part.

In witness whereof, I have hereunto signed my name.

GEORGE HOLT FRASER.